April 28, 1964 A. G. BAKER 3,130,876
DISPENSING APPARATUS FOR THERMOPLASTIC ADHESIVE
Filed Jan. 19, 1962 2 Sheets-Sheet 1
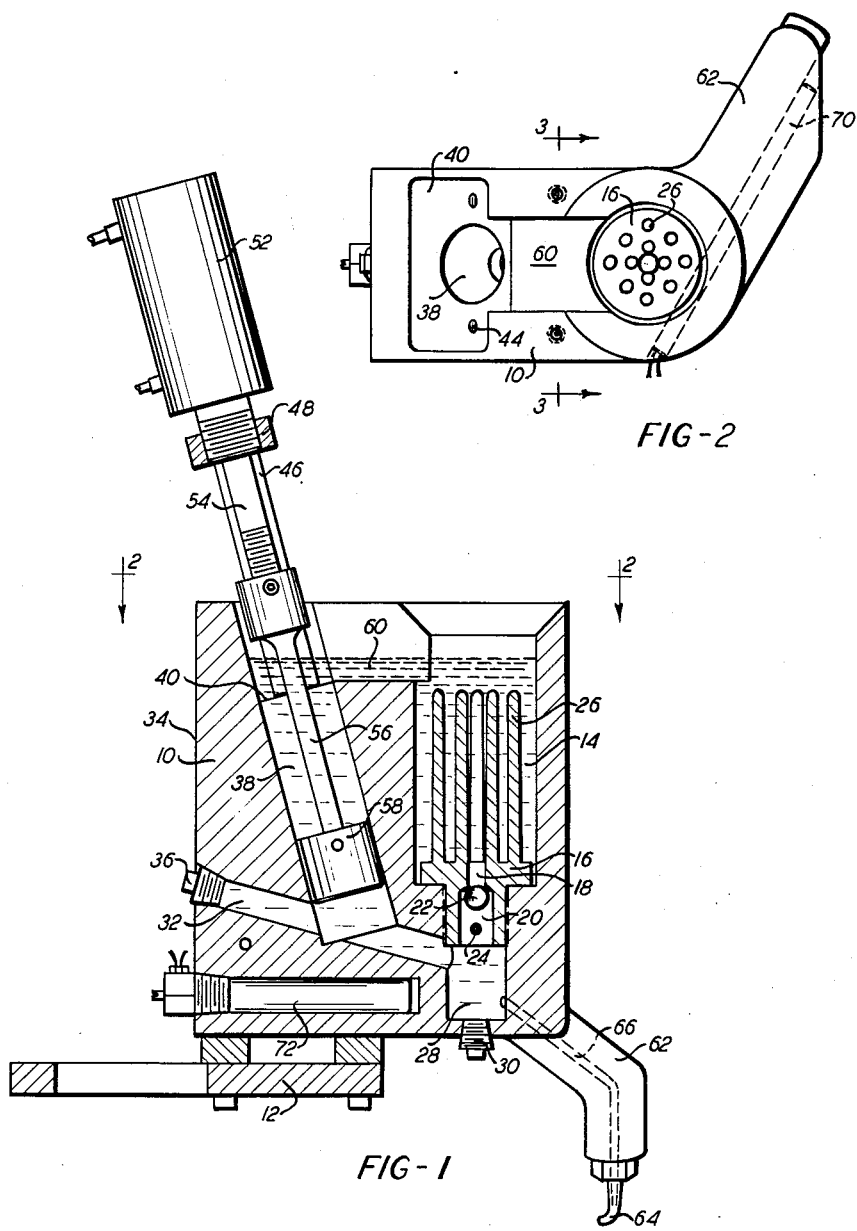
INVENTOR.
Alan G. Baker
BY Albert Gordon
ATT'Y April 28, 1964   A. G. BAKER   3,130,876
DISPENSING APPARATUS FOR THERMOPLASTIC ADHESIVE
Filed Jan. 19, 1962   2 Sheets-Sheet 2

INVENTOR.
Alan G. Baker
BY *Albert Gordon*
ATT'Y 3,130,876
DISPENSING APPARATUS FOR THERMOPLASTIC
ADHESIVE
Alan G. Baker, Plymouth, Mass., assignor to
Jacob S. Kamborian, West Newton, Mass.
Filed Jan. 19, 1962, Ser. No. 168,578
6 Claims. (Cl. 222—146)

In applicant's copending application, Serial No. 112,417, filed May 24, 1961, there is disclosed an apparatus for dispensing molten thermoplastic adhesive onto work. This apparatus comprises a heated pot that has a chamber, a well above the chamber, a valve between the well and chamber that is closed in response to the application of pressure to the chamber, a nozzle, a conduit extending from the nozzle to the chamber, a bore in communication with the chamber, a plunger slidably mounted in the bore and a motor for reciprocating the plunger.

In the operation of this apparatus, solid adhesive placed in the well is melted and gravitates into the chamber. Actuation of the motor to move the plunger in the bore towards the chamber causes the valve to close and molten adhesive to be extruded from the chamber through the nozzle onto the work. The molten adhesives used in the apparatus are dispensed at a rather high temperature, ranging up to 600° F. and have the characteristic of carbonizing when deposited in a thin film on a hot surface. Because of this, molten adhesive seeps past the plunger to the side of the plunger remote from the chamber, drips out of the bore and solidifies on the wall of the pot and on other adjacent equipment thereby fouling the pot and the other equipment. In addition, an undesirable cake of carbon is formed in the inner periphery of the bore.

In order to overcome these deficiencies in the instant invention a channel extends from the top of the bore to the top of the well, and the well, chamber, bore and channel are filled with molten adhesive. In addition, clearance is provided between the plunger and the bore. With this arrangement, the plunger is reciprocated through the molten cement, and adhesive seeping past the plunger finds its way back to the well. The clearance between the plunger and the bore is made sufficiently large to inhibit the carbonization of the film of adhesive seeping past the plunger during the reciprocation of the plunger.

It is preferred to fill the well with solid crystals of adhesive. To provide for rapid melting of the crystals, the well has nodes that rise from the bottom of the well for substantially the full height of the well. Since the crystals are interspersed between the nodes, the heating of the pot causes the nodes to be heated and thereby simultaneously radiate heat against all the crystals in the well.

In the accompanying drawings:

FIGURE 1 is a side elevation, partly in section, of the apparatus;

FIGURE 2 is a plan view of the apparatus, taken on the line 2—2 of FIGURE 1, with the motor for driving the plunger omitted;

Figure 4:
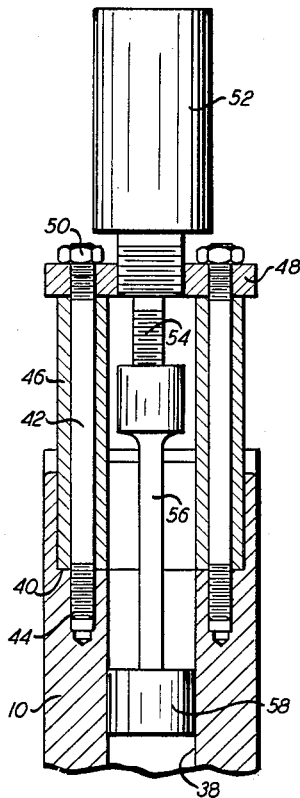
FIGURE 4 is a partly sectional view of the bore, the plunger and the motor for driving the plunger.
Figure 3:
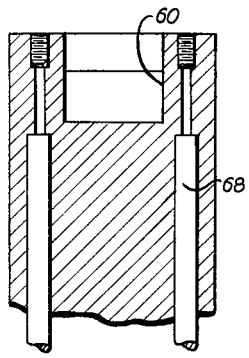
FIGURE 3 is a section taken on the line 3—3 of FIGURE 2.

The apparatus comprises a pot 10 mounted on a base 12. The pot is made of a heat conductive material such as aluminum and includes a well 14 in which a column of adhesive, preferably in the form of a plurality of small crystals, may be placed. An adhesive support 16 is threaded into a hole in the bottom of the well 14. The support 16 has a centrally located small diameter passage 18 that opens into a larger diameter passage 20. A ball 22, resting on a pin 24 extending across the passage 20, is cooperative with the passage 18 to act as a valve in the manner described below. The support 16 has a plurality of nodes 26 extending upwardly therefrom. The passage 20 opens into a chamber 28 having a drain plug 30 at its bottom. An orifice 32 extends from the side 34 of the pot and intersects the chamber 28. The orifice 32 is closed by a plug 36. An inclined bore 38 extends downwardly from a ledge 40 below the top of the pot and intersects the orifice 32. A pair of bolts 42 are threaded into holes 44 located in the ledge 40 on opposite sides of the bore 38. A spacer sleeve 46 envelops each bolt 42 and rests on the ledge 40. The bolts 42 extend through openings in a plate 48 and nuts 50 threaded on the upper ends of the bolts serve to clamp the plate 48 against the tops of the spacer sleeves 46. A fluid actuated motor 52 is threaded into the plate 48 and has a piston rod 54 extending downwardly therefrom coaxially with the bore 38. The piston rod 54 is secured to a shank 56 which in turn is secured to the plunger 58 that is slidable in the bore 38. The well 14 and the ledge 40 are connected by a channel 60 extending downwardly from the top of the pot 10. The pot 10 has a downwardly extending projection 62 to the lower end of which is secured a nozzle 64. A conduit 66 extends through the projection 62 and the nozzle 64 to provide communication between the chamber 28 and the lower end of the nozzle. The conduit 66 has a smaller cross-sectional area than the passages 18 and 20. A pair of electric cartridge heaters 68 are located in vertical holes in the pot on opposite sides of the channel 60 between the bore 38 and the well 14 and a third electric cartridge heater 70 is provided in a hole on the projection 62. The heaters are controlled by a thermostat 72 located in a hole in the pot below the orifice 32.

In the operation of the apparatus, the plunger 58 is normally in the upper position shown in FIGURE 4 and the ball 22 is normally resting on the pin 24 with a space between the ball and the walls of the passage 20 and between the ball and the bottom of the passage 18. The heaters 68 and 70 are turned on and adhesive in crystalline form is poured into the well 14, the channel 60 and the bore 38. The thermostat 72 is set to control heaters 68 and 70 to melt the adhesive and maintain it molten at a predetermined temperature, which with certain types of adhesives ranges up to 600° F. The nodes 26 heat the crystals of solid adhesive located in the well 14 interspersed between the nodes and thereby cause a relatively rapid melting of the adhesive in the well. The molten adhesive gravitates from the well through the passages 18 and 20 into the chamber 28 and from the chamber 28 into the orifice 32 and the bottom of the bore 38 so that molten adhesive eventually fills the well 14, the chamber 28, the orifice 32, the bore 38 and the channel 60 as indicated in FIGURE 1. Because of the relatively high viscosity of the molten adhesive and the relatively small cross-sectional area of the conduit 66, the adhesive does not flow through the conduit in the absence of a super atmospheric pressure.

When it is desired to extrude molten adhesive through the nozzle 64 onto work, a control mechanism, such as that disclosed in the aforementioned application Serial No. 112,417, filed May 24, 1961, is utilized to actuate the motor 52 to move the plunger 58 downwardly from its FIGURE 4 to its FIGURE 1 position. The downward movement of the plunger 58 creates a pressure to force the ball 22 up against the passage 18 to block the passage 18 and, at the same time, forces molten adhesive from the chamber 28, through the conduit 66, and onto the work. The closing of the passage 18 prevents backflow of adhesive upwardly therethrough. The heater 70 maintains the adhesive molten during its passage through the conduit 66.

The control may be actuated to move the plunger 58 upwardly at any time prior to its reaching the lower end of the bore 38, and in doing so immediately creates a suction in the conduit 66 to cause a reverse flow of the adhesive in the conduit and terminate the extrusion of adhesive from the nozzle. Since, as aforesaid, the adhesive used has a relatively high viscosity and tends not to flow downwardly through the conduit in the absence of a superatmospheric pressure, there is substantially no drip of adhesive from the nozzle until the plunger 58 is again moved downwardly. The suction force created by the upward movement of the plunger 58 also causes the ball 22 to move downwardly against the pin 24, to thereby open the passages 18, 20 thereby causing adhesive to be drawn from the well 14 into the chamber 28. The area of the passage around the ball 22 is sufficiently larger than the cross-sectional area of the conduit 66 to permit flow of adhesive through the passages 18 and 20 despite the relatively high viscosity of the adhesive while at the same time drawing a negligible amount of adhesive upwardly through the conduit 66.

As aforesaid, the adhesives used have the characteristic of carbonizing and otherwise becoming deleteriously affected when a thin layer of it is formed on a heated surface. The clearance between the plunger 58 and the bore 38 is large enough to enable a film to be formed between the plunger and bore of sufficient thickness as to inhibit the deterioration of the adhesive by the heat radiating from the wall of the bore. This film acts as a lubricant between the plunger and the bore during the reciprocation of the plunger. The clearance is made sufficiently small as to prevent a substantial pressure loss during the downward working stroke of the plunger. During the movement of the plunger in the bore, some adhesive moves between the plunger and the bore from one side to the other of the plunger, and during the up stroke of the plunger, the adhesive above the plunger is swirled from the bore through the channel 60 into the well 14.

This arrangement enables the adhesive that seeps past the plunger 58 during its downward working stroke to be conducted back to the well 14, and none of the adhesive seeping past the plunger drips out of the apparatus to foul adjacent equipment and to be lost for dispensing purposes.

It should be understood that the present disclosure is for the purpose of illustration only and that this invention includes all modifications that come within the scope of the appended claims.

I claim:

1. An adhesive dispensing apparatus comprising: a pot; a chamber in the pot; a nozzle; a conduit extending from the chamber to the nozzle; a well positioned above the chamber; an adhesive support in the well; a passage in the adhesive support interconnecting the well and the chamber; valve means normally located spacedly from the passage; means supporting the valve means to enable it to move into blocking relation with respect to the passage upon the application of pressure to the chamber; a bore in the pot extending upwardly of and in communication with the chamber; a plunger slidably mounted in the bore; a motor connected to the plunger for reciprocating the plunger through a zone of reciprocation located between the ends of the bore; and a channel in the pot extending from the top of the well to the top of the bore.

2. An adhesive dispensing apparatus comprising: a pot; a chamber in the pot; a nozzle; a conduit extending from the chamber to the nozzle; a well positioned above the chamber; an adhesive support in the well; a passage in the adhesive support interconnecting the well and the chamber; valve means normally located spacedly from the passage; means supporting the valve means to enable it to move into blocking relation with respect to the passage upon the application of pressure to the chamber; a bore in the pot extending upwardly of and in communication with the chamber; a ledge at the upper end of the bore; motor support means connected to and extending upwardly of the ledge; a fluid pressure motor, connected to the motor support means, having a piston rod extending downwardly therefrom coaxially with the bore; a plunger, slidably mounted in the bore and connected to the piston rod; and a channel in the pot extending from the top of the well to the ledge.

3. The apparatus according to claim 2 further comprising: means for applying heat to the pot; and nodes extending upwardly from the adhesive support a distance corresponding substantially to the depth of the well.

4. An adhesive dispensing apparatus comprising: a pot; means for heating the pot; a well in the pot; an adhesive support at the bottom of the well; a chamber in the pot located below the well; a passage in the adhesive support interconnecting the well and the chamber; valve means normally located spacedly from the passage; means supporting the valve means to enable it to move into blocking relation with respect to the passage upon the application of pressure to the chamber; a nozzle; a conduit extending from the chamber to the nozzle; means for applying pressure to the chamber; and a plurality of nodes extending upwardly from the bottom of the adhesive support for a distance that substantially corresponds to the depth of the well.

5. An adhesive dispensing apparatus comprising: a pot; a chamber in the pot; a nozzle; a conduit extending from the chamber to the nozzle; a well positioned above the chamber; an adhesive support in the well; a passage in the adhesive support interconnecting the well and the chamber; a bore in the pot extending upwardly of and in communication with the chamber; a plunger slidably mounted in the bore; means for reciprocating the plunger through a zone of reciprocation located between the ends of the bore; means operative in response to movement of the plunger toward the chamber to block said passage; and a channel in the pot extending from the top of the well to the top of the bore.

6. An adhesive dispensing apparatus comprising: a pot; means for heating the pot; a well in the pot; an adhesive support at the bottom of the well; a chamber in the pot located below the well; a passage in the adhesive support interconnecting the well and chamber; a nozzle; a conduit extending from the chamber to the nozzle; means for applying pressure to the chamber; means responsive to the application of said pressure to block said passage; and a plurality of nodes extending upwardly from the bottom of the adhesive support for a distance that substantially corresponds to the depth of the well.

References Cited in the file of this patent

UNITED STATES PATENTS

| | | |
|---|---|---|
| 483,367 | Robertson | Sept. 27, 1892 |
| 1,047,791 | Gregg et al. | Dec. 17, 1912 |
| 1,279,682 | Fort | Sept. 24, 1918 |
| 1,457,634 | Neri | June 5, 1923 |
| 2,153,519 | Horton | Apr. 4, 1939 |
| 2,893,026 | Sillars et al. | July 7, 1959 |
| 2,916,262 | Flores | Dec. 8, 1959 |